Patented Nov. 10, 1942

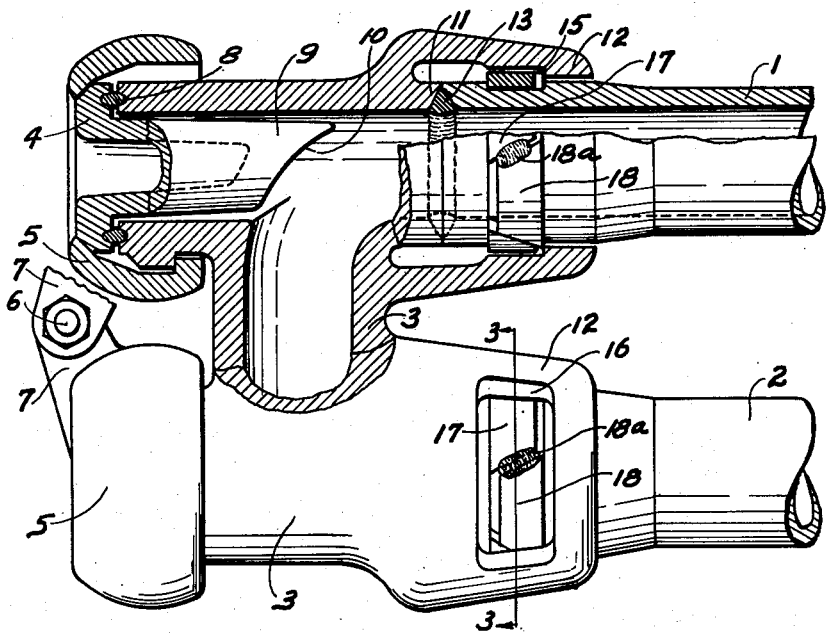
Fig. 1
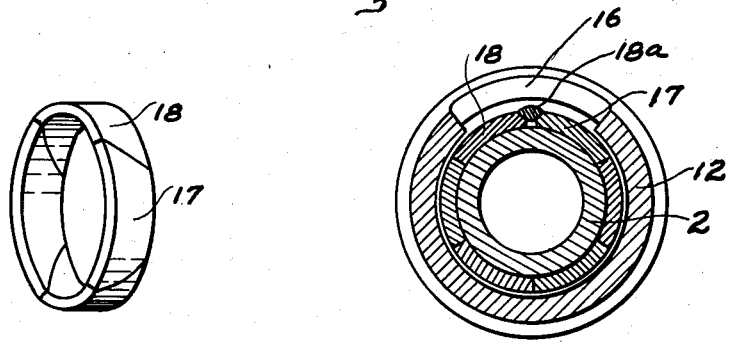
Fig. 2
Fig. 3
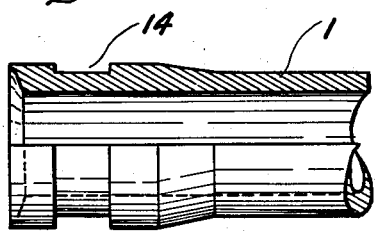
Fig. 4

2,301,296

UNITED STATES PATENT OFFICE 2,301,296

COUPLING

Milton P. Laurent, Houston, Tex.

Application April 5, 1941, Serial No. 387,003

4 Claims. (Cl. 285—161)

This invention relates to couplings and has for its general object the provision of a means for coupling a plurality of tubular members to each other and particularly for coupling a return bend or header to a plurality of tubes.

In joining tubes to a return bend or header it is customary to provide each tube with a part extending into the return bend or header and to then roll the end of the tube into a circumferential enlargement or over a corrugation in the interior of the return bend. It has also been proposed to butt weld the ends of the tubes to the openings in the return bend or header. However, neither this manner of joining the tubes to the return bend or header, nor the rolling method above referred to have been found to be entirely safe. On occasions both have been known to give way with disastrous results.

In an effort to form a joint stronger than either of the two joints mentioned, it has been proposed not only to roll the tubes in place but to then weld the tubes to the return bend or header both at the ends of the tubes and at the outer edges of the openings into the header or return bend. This, however, has been found to be less safe than a joint formed of the rolling alone because the changes in dimensions of the various parts under varying heat conditions serve both to weaken both the joint formed by rolling and to cause the welded connections to break.

In view of the foregoing, it is an object of this invention to provide a means for use in connection with a joint between a return bend or header, which means will serve as a safety measure to prevent the parting of the joint in the event of the failure of the principal joint forming means.

It is a further object of this invention to provide such a joint which will have all of the advantages of a welded or rolled joint and which will be safer than either.

It has been proposed also that joints for the purpose set forth be formed by clamping the ends of the tubes against seats formed about the ends of other tubes to which they are to be joined or about the openings in the return bend or header as the case may be. However, this is many times impossible because where two tubes are to be joined together they might not quite engage each other, and when two or more tubes are to be joined to a return bend or header the ends of the tubes to be joined to the return bend or header do not always lie in the same plane. That is, there may be two or more tubes which are of different lengths. These differences in length must, of course, be removed before the ends of the tubes can be clamped against the seats around the openings in the return bend or header to provide a perfect joint. This problem is especially present where more than two tubes are to be joined to a single header as in the case, for example, with a four hole header.

It is, therefore, an object of this invention to provide a joint which may be employed to join two tubes together or to join to a return band or header with complete safety two or more tubes of different lengths.

Other objects and advantages of this invention will become apparent from the following description taken in connection with the accompanying drawings wherein are set forth by way of illustration certain applications of this invention.

In the drawings:

Fig. 1 shows a side elevation with parts broken away and illustrated in longitudinal cross section illustrating two tubes joined to a return bend in accordance with this invention;

Fig. 2 is a perspective view illustrating the composite locking ring forming a part of the joint provided by this invention;

Fig. 3 shows a transverse cross section taken along the line 3—3 of Fig. 1;

Fig. 4 is a view partly in side elevation and partly in longitudinal cross section showing the construction of the end of a tube formed in accordance with this invention;

Figure 5:
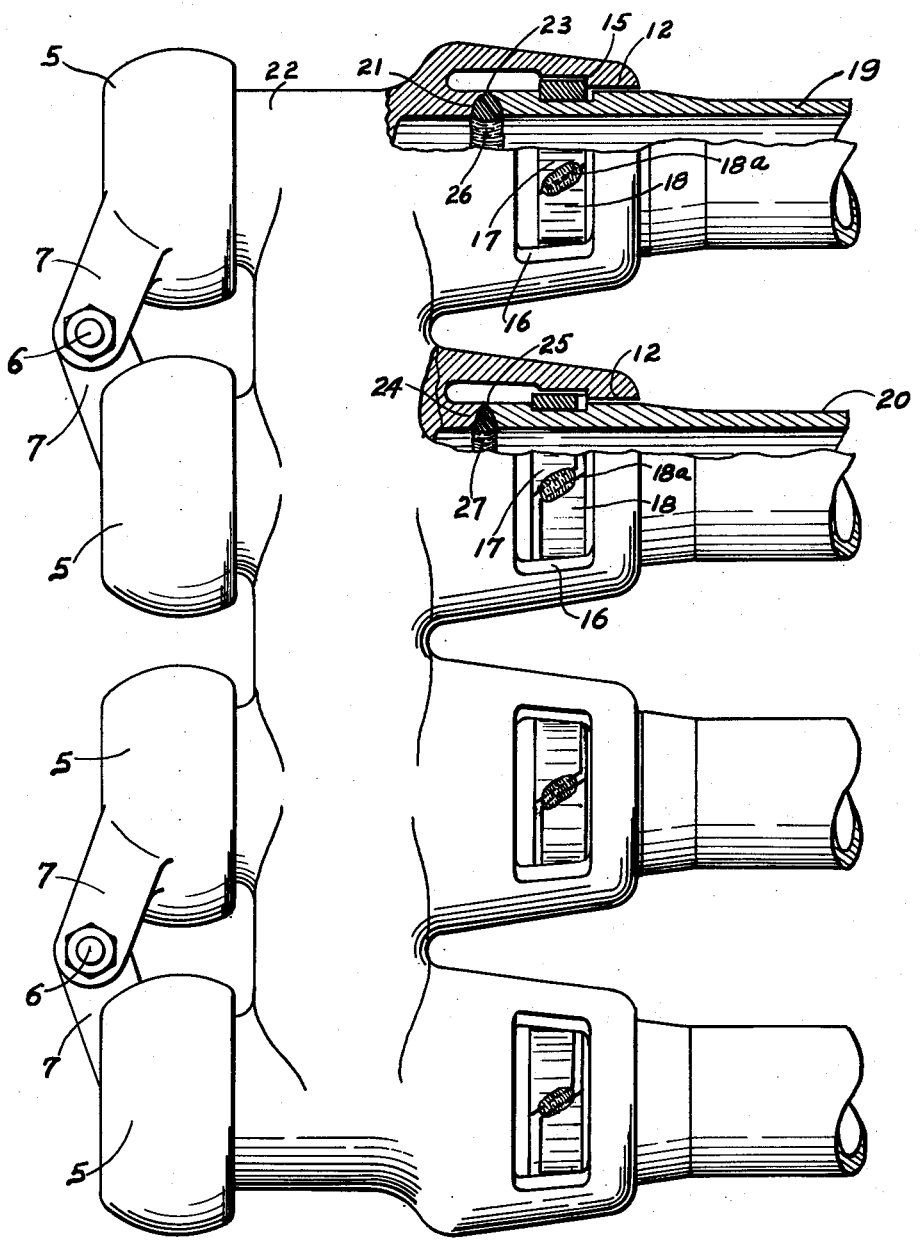
Fig. 5 is a view similar to Fig. 1 but illustrating the application of this invention to the joints between four tubes and a four hole header.

Referring first to Fig. 1, the tubes 1 and 2 are shown joined to the return bend 3 by means of joints constructed in accordance with this invention. The interior of the return bend 3 is made accessible by means of removable caps 4 which close the outer ends thereof. These caps are held in place by means of nuts 5 and these nuts in turn are held against being unscrewed by means of a bolt 6, which passes through the lugs 7 on the respective nuts. Between the caps 4 and the edges of the openings into the return bend are interposed metal gaskets 8 or any other suitable form of sealing means. The caps 4 have formed thereon parts 9 which project into the return bend and which have curved surfaces 10 on their inner ends that follow substantially along the regular curved line of flow through the return bend. These are for the purpose of preventing undue turbulence of flow through the return bend.

Referring now more particularly to the joint formed in accordance with this invention, it is noted that the return bend has an inner annular flange terminating at 11 and an outer annular flange 12 extending beyond the inner annular flange. The inner flange 11 is beveled and the end of the tube 1 is beveled so as to provide a "V-shaped" groove between the parts when the end of the tube 1 is brought adjacent the end of the flange 11. These two parts are then joined by welding as shown at 13.

As illustrated in Fig. 4, there is a groove 14 formed in the outer surface of the tube adjacent its end, and the flange 12 is formed with a shoulder 15. This shoulder faces toward the welded portion of the joint just described and is adapted to lie adjacent that edge of the groove 14 which is most remote from the end of the tube, when the tube is in position as illustrated in Fig. 1.

Now, the flange 12 has an opening 16 extending therethrough for a portion of its circumference and in a position overlying the groove 14 in the tube. In accordance with this invention, there is provided a composite ring formed of any suitable number of parts 17 and 18, four of such parts being shown in Fig. 2 and six in Fig. 3. Each of these parts of the ring is provided with oppositely beveled ends adapted to fit against similarly formed ends on the adjacent parts of the ring.

After the tube and return bend have been assembled as shown in Fig. 1, this composite ring is put into place piece by piece through the opening 16. After the last piece is in place, the two pieces lying immediately adjacent each other under the opening 16 will be spread apart. Due to the beveled ends on the ring sections 17 and 18 this will cause one-half of these sections to move longitudinally of the tube in one direction and the other half to move in the opposite direction until half of the sections engage the shoulder formed by the edge of the groove 14 that is nearest the end of the tube, and the other half of the sections engage the shoulder 15 within the flange 12. As will readily be seen this will prevent the withdrawal or any substantial movement of the tube 1 from or with respect to the return bend 3 even in the absence of the welding 13. The sections of the composite ring where they have been spread apart as just referred to are then welded as illustrated at 18—a in Figs. 1 and 3 to hold them in their spread position.

The application of this invention to a four hole header is illustrated in Fig. 5, and in this figure also is illustrated the manner in which this invention is applicable to forming joints with tubes of different lengths. In Fig. 5 the uppermost tube 19 is shown as being substantially shorter than the next tube 20. Thus, the tube 19 is spaced at its end a substantial distance from the flange 21 in the four hole header 22 as shown at 23, whereas the end of the tube 20 abuts directly the flange 24 as shown at 25. Both tubes 19 and 20 are joined by means of welding 26 and 27 respectively as heretofore described. Then when the sections 18 and 19 of the respective composite rings are put in place, those employed in connection with the tube 19 can not be spread as much as those used in connection with the tube 20, but in both cases the connection between the shoulder within the flange 12 and the groove on the tube will be snug and neither tube will be permitted to move away from its connection with the header.

In operation, it will be appreciated that if for any reason the welded joint 13 or either of the welded joints 26 or 27 should fail, none of the respective tubes would be allowed to move away from the return bend or header. Instead, they will be held closely in position by means of the split ring connection described.

Thus, this invention provides a safety means which prevents the parting of a tube from its return bend or header in the event the principal joint forming means should for any reason fail. This will prevent the disastrous consequences that would result in the event these parts should separate during the use of this device.

It will further be appreciated that while a welded joint has been illustrated between the end of the tubing and the return bend or coupling in each instance of the drawings, this invention is also applicable to other means of joining these parts, such as by the rolling method above referred to.

A means has thus been provided whereby tubes of different lengths may safely and economically be joined to a return bend or header and whereby each tube will be prevented from moving with respect to its return bend or header.

Having described my invention I claim:

1. In a means for preventing the separation of two parts connected by a sealed joint, means on said parts respectively telescoping each other and having adjacent but spaced opposed shoulders, and a composite wedge ring wedged between said shoulders comprising a plurality of segmental wedge members with complementally tapered abutting ends, and means for holding said wedge members in wedging engagement with each other and with said opposed shoulders.

2. In a device of the character described, in combination, a fitting having a hole opening in one direction and adapted to receive a tube, the hole having adjacent thereto a projecting part having an internal shoulder facing toward the interior of said fitting, a tube of a diameter to fit within said part and adapted to be connected to said fitting inwardly of said shoulder, said tube having a shoulder on its outer surface adjacent its end facing away from the interior of said fitting and opposed to the shoulder of said part, means for joining said fitting to said tube, and axially adjustable circumferentially extending wedge means having opposite substantially parallel surfaces engageable with said shoulders to prevent separation of said fitting and said tubes respectively.

3. In a device of the character described, in combination, a fitting having a hole to receive a tube, said hole having adjacent thereto a projecting part having an internal shoulder facing toward the interior of said fitting, a tube of a diameter to fit within said part and adapted to be connected to said fitting inwardly of said shoulder, said tube having a shoulder on its outer surface adjacent its end facing away from the interior of said fitting and opposed to the shoulder of said part, means for joining said fitting to said tube, said part having an opening therein overlying a portion of the space between the shoulder in said part and the shoulder on the tube when the tube is fully assembled with respect to the fitting, and a composite ring comprising a plurality of segmental parts each part having its opposite ends oppositely beveled in an axial direction and fitting against complementary beveled ends on the next segmental part of the ring, each segmental part being of a size to pass through said opening in said first mentioned part on the fitting, whereby when said segmental parts are put into position they will fit between said shoulders and when adjacent ones of said segmental parts directly beneath said opening are pushed apart they will cause alternate segmental parts to bear against the said outwardly facing shoulder on the tube and the inwardly facing shoulder in the part on the fitting, and means for securing the segmental parts so separated in their separated position.

4. In a device of the character described, in combination, a fitting having a hole opening in one direction and adapted to receive a tube, the hole having adjacent thereto a projecting part having an internal shoulder facing toward the interior of said fitting, a tube of a diameter to fit within said part and adapted to be connected to said fitting inwardly of said shoulder, said tube having a shoulder on its outer surface adjacent its end facing away from the interior of said fitting and opposed to the shoulder of said part, weld metal joining said fitting to said tube, axially adjustable circumferentially extending wedge means having opposite substantially parallel surfaces engageable with said shoulders to prevent separation of said fitting and said tubes respectively, and weld metal maintaining said wedge means in wedging engagement with said shoulders.

MILTON P. LAURENT.